US012724103B1

(12) United States Patent
Al Ahmad et al.

(10) Patent No.: US 12,724,103 B1
(45) Date of Patent: Sep. 1, 2026

(54) ROTATING ANTENNA FOR IONIZING-RADIATION SENSING VIA FAR-FIELD PATTERN PERTURBATION

(71) Applicant: United Arab Emirates University, Al Ain (AE)

(72) Inventors: Mahmoud F. Y. Al Ahmad, Al Ain (AE); Amine El Moutaouakil, Al Ain (AE)

(73) Assignee: UNITED ARAB EMIRATES UNIVERSITY, Al Ain (AE)

( * ) Notice: Subject to any disclaimer, the term of this patent is extended or adjusted under 35 U.S.C. 154(b) by 0 days.

(21) Appl. No.: 19/376,775

(22) Filed: Oct. 31, 2025

(51) Int. Cl.
*G01S 1/02* (2010.01)
*G01S 1/04* (2006.01)
*G01S 1/06* (2006.01)

(52) U.S. Cl.
CPC .............. *G01S 1/0428* (2019.08); *G01S 1/06* (2013.01); *G01S 1/045* (2013.01)

(58) Field of Classification Search
CPC .......... G01S 1/0428; G01S 1/045; G01S 1/06; G01S 1/00
USPC .......................................... 342/385, 386, 398
See application file for complete search history.

(56) References Cited

U.S. PATENT DOCUMENTS 7,570,169 B2 * 8/2009 Li .......................... H01Q 9/065 343/745
7,679,563 B2 * 3/2010 Werner ................ H01Q 15/002 343/909
8,901,507 B2 12/2014 Kotter
9,086,487 B2 7/2015 Gopalsami et al.
10,581,176 B2 3/2020 Puchades et al.
12,176,962 B2 * 12/2024 Hammerschmidt ......................... H01Q 1/2283
2006/0244606 A1 11/2006 Li et al.
2008/0224947 A1 9/2008 Werner et al.
2012/0024044 A1 * 2/2012 Tao .......................... G01V 5/26 73/30.01
2012/0305773 A1 * 12/2012 Wu .................... G01N 33/0057 250/339.07

(Continued)

FOREIGN PATENT DOCUMENTS

CN 107949989 B * 4/2021 ............ H04W 72/23
KR 0156407 B1 * 10/1998 ................ B60P 3/00

*Primary Examiner* — Chuong P Nguyen
(74) *Attorney, Agent, or Firm* — Knobbe Martens Olson & Bear, LLP

(57) ABSTRACT

Methods, systems, and sensing units related to detecting and characterizing ionizing-radiation using radio-frequency antennas. A method includes rotating at least one radiator of a radio-frequency transmitter antenna, where the radiator is at least in part coated with a radiation-sensitive material. The method includes emitting a far-field radiation pattern from the transmitter antenna and receiving, at a radio-frequency receiver antenna, a receive signal indicative of the far-field radiation pattern, wherein exposure of the radiation-sensitive material to ionizing-radiation perturbs the far-field radiation pattern. The method further includes generating antenna response data based on the received signal, and computing, based on the antenna response data, a presence-confidence metric indicative of exposure to ionizing-radiation and/or a traveling direction of an ionizing-radiation source. Disclosed sensing units and systems may perform such methods.

18 Claims, 5 Drawing Sheets

(56) References Cited

U.S. PATENT DOCUMENTS

2014/0246600 A1* 9/2014 Kotter ....................... G01T 3/00
250/389

* cited by examiner

ROTATING ANTENNA FOR IONIZING-RADIATION SENSING VIA FAR-FIELD PATTERN PERTURBATION

TECHNICAL FIELD

The present disclosure relates to a method, sensing unit, and system for detecting, localizing and tracking ionizing-radiation through far-field radio-frequency pattern perturbations.

BACKGROUND

During a nuclear emergency, one of the most critical challenges is to quickly and accurately determine the shape and movement of the radioactive plume, i.e., ionizing-radiation source, in the atmosphere. Current methods mainly rely on computer models of weather and dispersion, which can be uncertain and slow to update. Reliable, real-time monitoring is needed to protect public health and guide emergency response.

SUMMARY

Accordingly, there is a need for systems, apparatuses, and methods for detecting ionizing radiation that can provide not only an indication of the presence of a radiation source but also information about its characteristics, such as its direction of travel. There is a further need for such systems to be scalable for wide-area monitoring, adaptable to changing environmental conditions, and capable of distinguishing between different levels of detection certainty to enable efficient resource allocation and response.

A sensing unit is disclosed. The sensing unit may comprise a radio-frequency transmitter antenna, which may be outfitted with a radiation-sensitive material, such that exposure to ionizing-radiation may perturb a far-field radiation pattern of the transmitter antenna. The transmitter antenna may comprise a rotation drive, which may be arranged to rotate a radiator of the transmitter antenna about a rotation axis. The sensing unit may further include a radio-frequency receiver antenna, which may be configured to provide a received signal, such as a signal based on the far-field radiation pattern emitted by the transmitter antenna. The sensing unit may also include control circuitry, such as circuitry including at least one processor and non-transitory memory storing instructions. The sensing unit may be configured to generate antenna response data, such as data based on the received signal from the receiver antenna, and may be configured to compute, based at least in part on the antenna response data, a presence-confidence metric, which may be indicative of exposure to ionizing-radiation, and/or a traveling direction of an ionizing-radiation source.

Further, a system is disclosed. The system may comprise a plurality of sensing units, such as the sensing units described herein. Each transmitter antenna and a corresponding receiver antenna may form an antenna pair. In some arrangements, each transmitter antenna may be associated with a geospatial location, and the plurality of antenna pairs may be geographically distributed and/or communicatively coupled to a central controller. The system may be configured to obtain, such as from each receiver antenna, a received signal indicative of a far-field radiation pattern emitted by a corresponding transmitter antenna. The system may be further configured to generate, such as for each received signal, antenna response data indicative of one or more characteristics of the far-field radiation pattern. The system may also be configured to compute a local presence-confidence metric and/or a local traveling direction of an ionizing-radiation source for a respective antenna pair, and to associate the respective local presence-confidence metric and/or local traveling direction with a geospatial location.

Further, a method is disclosed. The method may include rotating, such as by a rotation drive of a transmitter antenna, at least one radiator about a rotation axis, wherein at least one of the at least one radiator is, for example at least in part, coated with a radiation-sensitive material. The method may include emitting, such as by the radio-frequency transmitter antenna, a far-field radiation pattern. The method may comprise receiving, such as at a radio-frequency receiver antenna, a receive signal, which may be indicative of the far-field radiation pattern emitted by the transmitter antenna, wherein exposure of the radiation-sensitive material to ionizing-radiation may perturb the far-field radiation pattern. The method may also include generating antenna response data, which may be indicative of one or more characteristics of the far-field radiation pattern, based on the received signal. The method may further include computing a presence-confidence metric, such as a metric indicative of exposure to ionizing-radiation, and/or a traveling direction of an ionizing-radiation source.

It is an advantage of the present disclosure to provide a novel mechanism for detecting ionizing radiation by monitoring perturbations in an antenna's far-field radiation pattern, which may offer a robust and potentially low-cost alternative to conventional radiation detectors.

Further, it is an advantage of the present disclosure that by rotating an antenna radiator, the sensing unit can determine a traveling direction of an ionizing-radiation source, providing critical information beyond mere presence detection.

It is a further advantage of the present disclosure that a system of geographically distributed sensing units may be deployed for wide-area surveillance, allowing for the tracking and localization of a radiation source over a large area.

Further, it is an advantage of the present disclosure that the sensing unit may operate in different modes, such as a coarse-scan mode for efficient, continuous monitoring and a fine-scan mode for detailed analysis upon potential detection, thereby optimizing power and computational resources.

It is a further advantage of the present disclosure that a baseline-establishment routine can be executed to calibrate the system, allowing it to distinguish between perturbations caused by radiation and those caused by environmental factors or system noise, thereby improving detection accuracy.

Further, it is an advantage of the present disclosure that a machine-learning model may be employed to analyze antenna response data, potentially enhancing the ability to accurately compute a presence-confidence metric and/or a traveling direction.

It is a further advantage of the present disclosure that a system having a plurality of sensing units may be configured to predict a future spatial distribution of ionizing radiation, enabling proactive responses and targeted activation of specific sensing units for enhanced tracking.

BRIEF DESCRIPTION OF THE DRAWINGS

The above and other features and advantages of the present disclosure will become readily apparent to those skilled in the art by the following detailed description of example embodiments thereof with reference to the attached drawings, in which.

DETAILED DESCRIPTION

Figure 1:
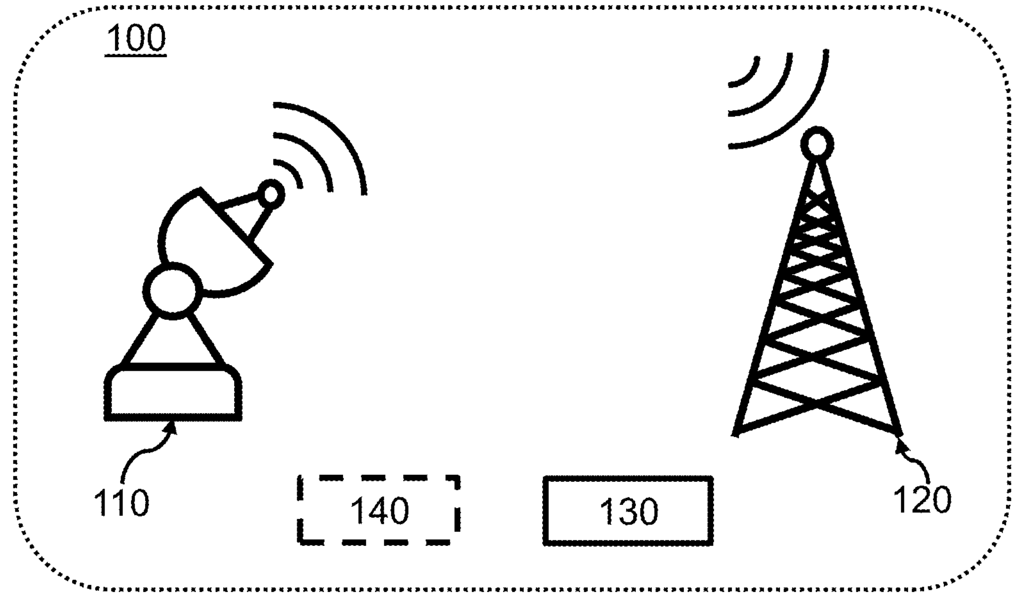
FIG. 1 is schematic illustration of an example sensing unit including a transmitter antenna, receiver antenna, control circuitry and environmental sensors.

Instruments that rely on or employ perturbation-based radio-frequency (RF) sensing for ionizing-radiation detection may be sensitive to changes or differences in antenna behaviour that alter perceived pattern characteristics. Instruments that infer ionizing-radiation conditions from localized interactions (e.g., point dosimetry and near-field coupling at or near a sensor body) may be sensitive to deployment variability (including, without limitation, temperature, humidity, shielding/layout changes, and ambient RF clutter), manufacturing tolerances, and aging. Such factors can lead to inconsistent scalar outputs across sites and over time.

Conventional discrete detectors typically provide point measurements with limited or no directional context, which can hinder attribution, situational awareness, and response (e.g., determining a bearing or evolution of an ionizing-radiation source).

Accordingly, the disclosure herein provides for a sensing unit including radio-frequency transmitter antenna outfitted with a radiation-sensitive material such that exposure to ionizing-radiation perturbs a far-field radiation pattern read by a radio-frequency receiver antenna, which may yield more reliable presence evidence that is referenced to a radiating structure rather than a local scalar detector. The antenna response data generated from the received signal indicative of far-field perturbation enable computation that may estimate a traveling direction of an ionizing-radiation source.

At a system level, reliance on sparse point readings can limit an operator's ability to estimate or forecast the spatial distribution of ionizing-radiation intensity over a monitored area, particularly under changing environmental conditions. Directionally informative, device-referenced measurements can improve conditioning of such estimations and provide richer inputs for localization and tracking.

The figures are schematic and simplified for clarity and intend to show details that aid understanding the disclosure, while other details may have been left out. Throughout, the same reference numerals are used for identical or corresponding parts.

FIG. 1 is a schematic illustration of example sensing unit 100 comprising a transmitting antenna 110 having a rotating radiator and a receiving antenna 120 having a fixed reference radiator. A far-field radiation pattern is constructed for the rotating radiator of the transmitter antenna 110. The rotatable radiator may be coated with radiation-sensitive materials, whereas the receiver antenna 120 may remain uncoated. In the presence of nuclear radiation, the near-field and far-field characteristics of the coated radiator will be altered due to its material interaction with the radiation environment. In contrast, the reference radiator of the receiver antenna 120, lacking such a coating, may remain less affected relative the transmitter antenna 110.

Environmental sensors 140, such as weather and environmental sensing devices may be co-located with the rotatable radiator to provide contextual monitoring conditions.

The far-field measurement and sensing unit 100 may operate in real time and provide near real-time data acquisition.

Accurate far-field characterization may necessitate full 360-degree rotation of the coated radiator in incremental steps. Reducing the step size may enhance angular resolution and improves the fidelity of the measured radiation pattern.

To support continuous monitoring, the sensing unit 100 may perform fast rotational scans using coarse angular steps. Upon detecting potential anomalies or targets of interest, it may autonomously switch to finer angular resolution, thereby improving sensitivity and ensuring more accurate far-field characterization.

Figure 2:
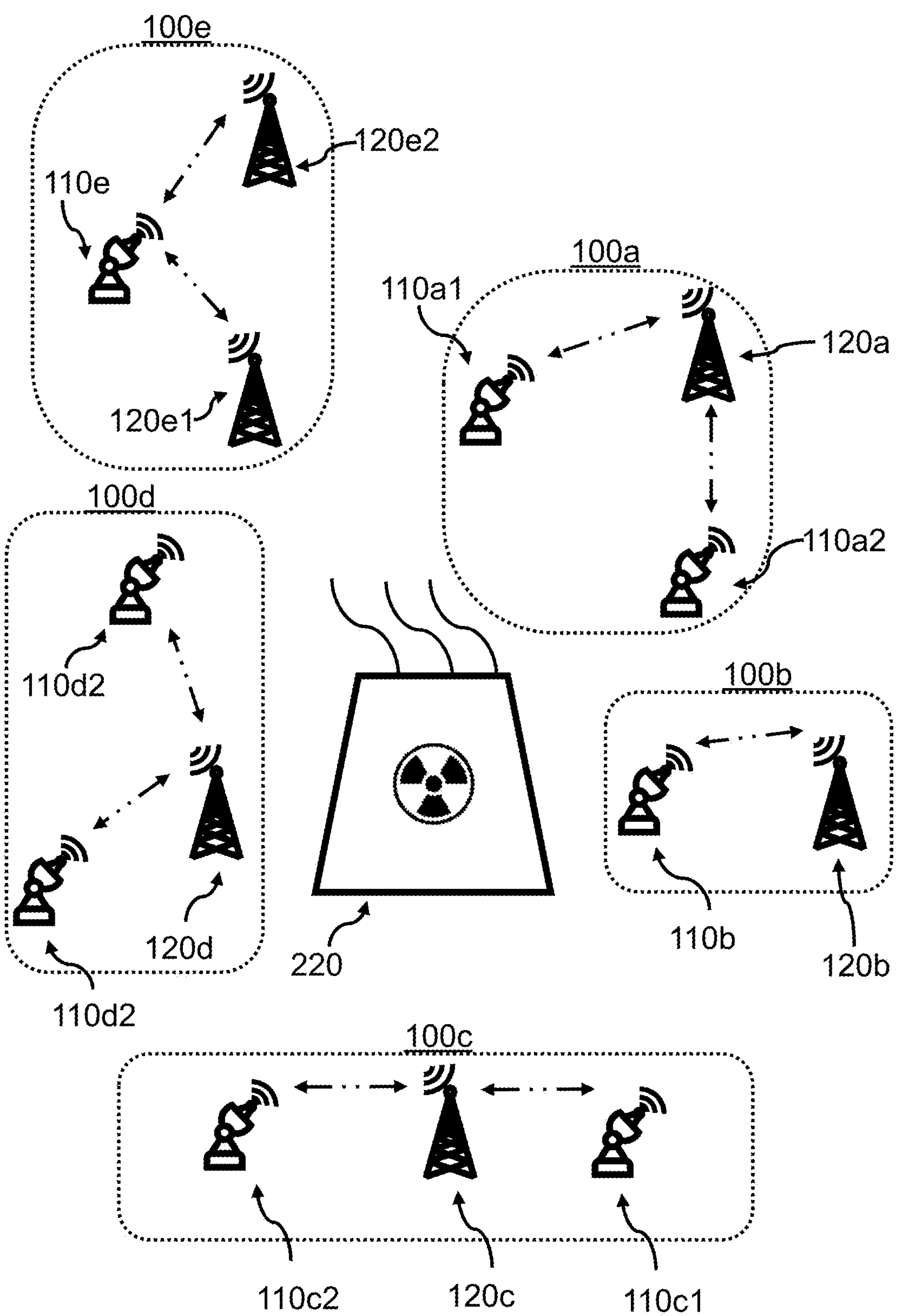
FIG. 2 is a schematic illustration of an example system including a plurality of sensing units and a nuclear facility.

FIG. 2 is a schematic illustration of example array of distributed sensing units **100*a*-100*e*, strategically positioned around the nuclear reactor 220 in accordance with a placement plan which may be based on historical statistical risk analysis. The sensing units 100*a*-100*e* may communicate with a central controller. This central controller may aggregate data from all active sensing units 100*a*-100*e* and may also govern system 200—wide responses, thereby automatically triggering or re-tasking additional sensing units upon detection of anomalies to ensure enhanced spatial resolution and system 200** sensitivity in real time.

Environmental sensors 140, e.g., for weather monitoring, may be co-located with the system 200 play a supporting role in dynamic control. Upon detection of anomalous events, data from these environmental sensors 140—such as prevailing wind direction or atmospheric conditions—can be used to optimize the transmitter antenna's **110*a*-110*e* rotational angle of the coated radiator or to trigger additional sensing units 100*a*-100*e***, thereby enhancing situational awareness and response efficiency.

There are a number of far-field characteristics that may be affected by nuclear radiation, these may include, for example:

- Radiation Pattern: Radiation exposure can cause non-uniform changes in the surface conductivity or permittivity of the coating material, leading to distortion in the radiation pattern. This may manifest as asymmetry, side lobe level changes, or main lobe deformation.
- Gain and Directivity: Changes in material properties of the coated radiator may reduce the efficiency of power radiation, leading to a drop in antenna gain or a shift in its main beam direction. If the transmitter antenna 110 loses uniformity or experiences localized conductivity degradation, its directivity may also be reduced.
- Beamwidth: As the radiation pattern is altered, the beamwidth may broaden or narrow unexpectedly. This is particularly important if the coating affects the aperture field distribution.
- Polarization: Radiation-induced material changes can lead to undesired depolarization or shifts from linear to elliptical/circular polarization due to anisotropic surface effects. This is critical in systems 200 where polarization matching is required.

Phase Pattern: Phase variations across the aperture can occur due to non-uniform dielectric shifts or localized conductivity degradation, leading to beam squinting or phase front distortion-especially in phased array systems 200.

Power Density: Reduced radiated power or altered directionality leads to unpredictable power density distribution in space. This may reduce coverage or sensitivity in intended directions.

While a single sensing unit 100 equipped with a coated rotatable radiator can detect changes in far-field characteristics indicative of nuclear radiation exposure and traveling direction, a distributed array of such units 100*a*-100*e* may be essential for predicting the spatial distribution of ionizing-radiation intensity emitted by the ionizing-radiation source, meaning the overall shape and spread of a radiation plume. By deploying multiple sensing units 100*a*-100*e* strategically around the reactor 220—e.g., based on historical and/or statistical data—the system 200 can capture spatial variations in antenna behavior, which are influenced by the plume's trajectory, intensity, and environmental factors such as wind direction. This spatially resolved data enables the central controller to reconstruct the plume profile in real time, enhancing situational awareness and supporting emergency response strategies.

The arrangement of the sensing units 100*a*-100*e* in FIG. 2 are merely illustrative and demonstrate that the disclosed techniques are compatible with (i) single- or dual-transmitter implementations, (ii) single- or dual-receiver implementations, and (iii) different geospatial distances between the transmitter and receiver antennas relative to a region of interest (e.g., the facility 220). Relative terms such as "closer" and "farther" refer to geospatial distance from the facility 220 as pictured and do not limit actual deployment geometries, which may be adapted to terrain, shielding, and network topology.

The sensing unit 100*a* includes two transmitter antennas 110*a*1, 110*a*2 and one receiver antenna 120*a*. In the illustrated arrangement the receiver antenna 120*a* is positioned farther away from the facility 220 than either of the transmitter antennas 110*al* or 110*a*2.

The sensing unit 100*b* includes a single transmitter antenna 110*b* and a single receiver antenna 120*b*. In this example the receiver antenna 120*b* is farther from the facility 220 than the transmitter antenna 110*b*.

The sensing unit 100*c* includes two transmitter antennas 110*c*1, 110*c*2 and one receiver antenna 120*c*. The receiver antenna 120*c* is disposed between the two transmitter antennas 110*c*1, 110*c*2, with the three antennas being approximately equidistant from the facility 220 in the view shown.

The sensing unit 100*d* includes two transmitter antennas 110*d*1, 110*d*2 and one receiver antenna 120*d*. In contrast to units 100*a*-100*b*, the receiver antenna 120*d* is closer to the facility 220 than either transmitter antenna 110*d*1 or 110*d*2.

The sensing unit 100*e* includes one transmitter antenna 110*e* and two receiver antennas 120*e*1, 120*e*2. In the depicted arrangement, receiver antenna 120*e*1 is on the facility-facing side of the unit, while receiver antenna 120*e*2 is laterally offset from 120*e*1 to provide spatial-diversity reception; the transmitter antenna 110*e* is further away than receiver antenna 120*e*1 (i.e., farther from the facility 220).

Figure 3:
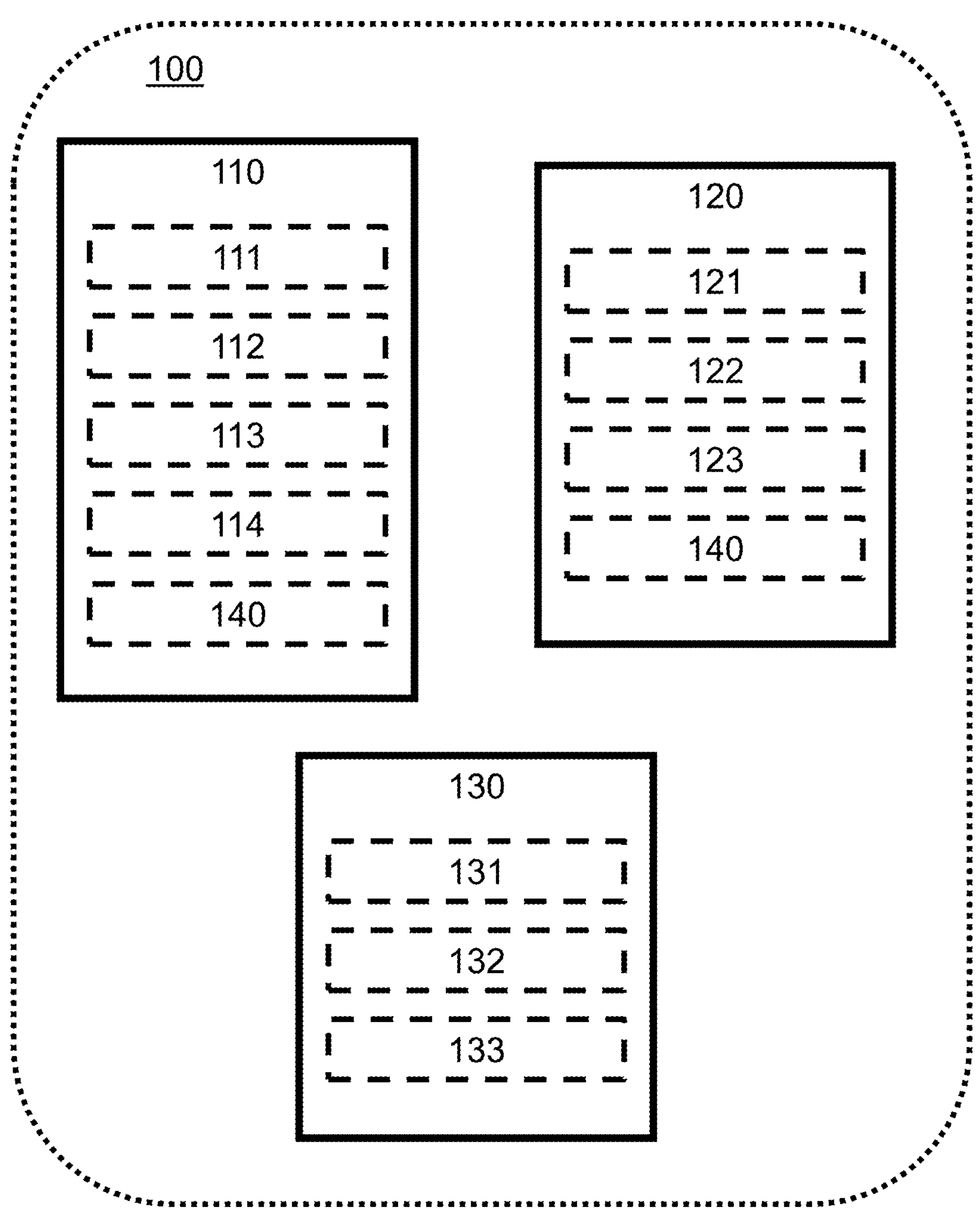
FIG. 3. is a block diagram of an example sensing unit having a transmitter antenna, receiver antenna, control circuitry, environmental sensors, and optional components relating thereto.

FIG. 3 is a block diagram of an example sensing unit 100 including a radio-frequency transmitter antenna 110, a radio-frequency receiver antenna 120 and control circuitry 130 including at least one processor 131 and non-transitory memory 132 storing instructions. The radio-frequency transmitter antenna 110 is outfitted with a radiation-sensitive material such that exposure to ionizing-radiation perturbs a far-field radiation pattern of the transmitter antenna 110. The radio-frequency receiver antenna 120 is configured to provide a received signal, which, based thereon, the sensing unit 100 may generate antenna response data indicative of characteristics of the far-field radiation pattern generated by the transmitter antenna 110. The transmitter antenna 110 may comprise a rotation drive 114 arranged to rotate a radiator 111 of the transmitter antenna 110 about a rotation axis. The sensing unit 100 may be the same sensing unit as described in relation to FIG. 1.

The far-field distance is the distance from an antenna where the radiated electromagnetic field pattern becomes stable and predictable, meaning it no longer changes shape with distance.

In some examples, the sensing unit 100, e.g., the control circuitry 130 thereof, may be configured to select an active mode from a group of modes comprising at least a coarse-scan mode and a fine-scan mode. In one example, the rotation drive 114 is configured to rotate the radiator 111 of the transmitter antenna 110 about the rotation axis in accordance with the active mode. For example, the sensing unit 100 may be configured to obtain antenna response data with a higher sampling density during the fine-scan mode relative to the coarse-scan mode.

In some examples, the radiation-sensitive material may be disposed as a coating on at least a part of at least one radiator 111 of the transmitter antenna 110. The radiation-sensitive material may be applied as coating to any suitable conventional antenna radiator structure.

The example transmitter antenna 110 may include any of the optional components of: a radiator 111, a transmitter 112, communication means 113, environmental sensors 140, and rotation drive 114.

The example receiver antenna 120 which may include any of the optional components of: a radiator 121, a receiver 122, communication means 123 and environmental sensors 140.

The example control circuitry 130 may include any of the optional components of: a processor 131, a memory 132 and communication means 133.

A radio-frequency, RF, antenna 110, 120 may refer to an antenna that uses a radiator 111, 121 to generate or receive radio waves. A feed line may connect a transmitter 112 or receiver 122 to the radiator 111, 121. An antenna 110, 120 may also comprise a ground plane that acts as a reflecting surface, a balun to ensure a proper connection between the feed line and the radiator 111, 121, an RF choke to prevent signal interference, and a radome for physical protection from the environment.

The transmitter 112 may refer to an electronic device or circuitry configured to generate a radio-frequency (RF) signal for subsequent radiation by the transmitter antenna 110. The transmitter 112 may produce an RF signal with specific characteristics, such as frequency, power, and modulation, which, when radiated, establishes the far-field radiation pattern that is monitored for perturbations. The transmitter 112 may comprise one or more of the following components: signal source or oscillator; amplifier, modulator; and, filtering and matching circuits. The transmitter 112 can be configured to generate continuous wave (CW) signals or pulsed signals, depending on the requirements of the sensing application. Control of the transmitter's 112 operation may be managed by control circuitry 130, or e.g., an external processor via the communication means 113.

The receiver 122 may refer to an electronic device or circuitry designed to detect and process the RF signal captured by the receiver antenna 120. The receiver 122 may be configured to convert the incoming electromagnetic waves, as captured by its associated radiator 121, into a usable electronic signal. This processed signal may constitute the received signal indicative of characteristics of the received far-field radiation pattern. The receiver 122 may include, but is not limited to, one or more of the following components: low-noise amplifier (LNA); filters; mixer and/or local oscillator; demodulator; and, analog-to-digital converter (ADC). The receiver's 122 output may include measurements of signal strength (amplitude), phase, polarization, or other metrics that characterize the far-field pattern. This data may then conveyed to the control circuitry 130 for analysis, e.g., via the communication means 123 of the receiver antenna 120.

The communication means 113, 123, 133 may refer to any hardware, software, or combination thereof that facilitates data and control signal exchange between the sensing units components, namely the transmitter antenna 110, the receiver antenna 120 and the control circuitry 130. The communication means 113, 123, 133 may provide the necessary interface for command, control, and data transfer, enabling coordinated operation of the sensing unit 100. The communication means 113, 123, 133 can be implemented using any suitable wired or wireless communication protocol, such as: ethernet, Universal Serial Bus (USB), Serial Peripheral Interface (SPI), $I^2C$, RS-232/485, coaxial cables, or fiber-optic links, Wi-Fi (IEEE 802.11 standards), Bluetooth, Zigbee, LoRaWAN, or cellular communication technologies (e.g., 4G LTE, 5G NR). For example, the sensing unit 100 may utilize the communication means 133 to send control commands to the transmitter antenna 110 (e.g., "initiate transmission") and to the receiver antenna 120 (e.g., "begin measurement"). Conversely, the receiver antenna 120 may use the communication means 123 to transmit the received signal to the sensing unit 100 for analysis and computation of antenna response data. This may allow for flexible deployment, including scenarios where the processor 131 is physically remote from the antenna assemblies 110, 120. It should however be understood that the control circuitry 130 may still be a part of the sensing unit 100 (i.e., it may be on a separate board/enclosure but still within the claimed unit), and that remote command/telemetry is optional.

The radiator structure of the radiator 111, 121 may be realized as any conventional antenna radiator structure, such as: (i) thin-conductor current elements (e.g., dipoles, monopoles, loops, helices); (ii) aperture or surface openings (e.g., horns, open waveguides, slots), including printed/planar microstrip implementations (e.g., patches, printed slots, PIFA); (iii) dielectric-body radiators (e.g., dielectric resonators, dielectric rods, ceramic chip radiators); (iv) traveling-wave or leaky-wave structures in which guided energy radiates progressively along the structure; and combinations thereof. In systems employing passive optics such as reflectors, lenses, transmit arrays, or reflect arrays, the radiator is the primary feed element (e.g., horn, dipole, or patch), while the passive optic shapes the resulting field. Multiple radiators may be combined as an array without altering the definition of each individual radiator.

The radiator 111, 121 of the transmitter antenna 110 or receiver antenna 120 may be formed by any conventional antenna radiator material. The material is suitably selected to balance RF conductivity, mechanical form factor, environmental stability, and compatibility with any radiation-sensitive coating described herein. Suitable conductive media may include, without limitation, bulk or plated metals (e.g., Cu, Al, Ag, Au, Ni, Ti), metalized foils or meshes, thick-/thin-film metallizations on ceramics or polymers (e.g., LTCC/HTCC, PTFE, LCP, PI), and printed conductors formed from sintered metallic inks or pastes (e.g., Ag, Cu), as well as transparent or conformal conductors (e.g., ITO, silver-nanowire networks, copper meshes, graphene or other carbon-based films, MXenes) for window or conformal deployments. Carbon-fiber composites or conductive elastomers may be used where structural or stretchable radiators are desirable. To stabilize RF performance and the radiation-sensitive layer's baseline, the radiator 111, 121 surface may include barrier/passivation stacks (e.g., Ni, TiW, ENIG/ENEPIG) that control diffusion and corrosion, and adhesion-conditioning (e.g., controlled roughness, primers or silanes) to promote durable coupling of the coating without materially degrading conductor Q. Where optical or weight constraints apply, sheet-resistance targets and conductor thicknesses may be chosen in view of skin-depth at the operating band, while resistive overlays or segments (e.g., NiCr, TaN, carbon inks) can be incorporated to tailor bandwidth or damping. For dielectric-body radiators, the "material" comprises low-loss dielectrics such as alumina, zirconia, engineered ceramics, or low-loss polymers, optionally with selective metallization to define excitation and control fringing fields.

In some examples, the sensing unit 100 may be configured to select an active mode from a group of modes comprising at least a coarse-scan mode and a fine-scan mode and, based at least in part on the antenna response data:

- compute, in the coarse-scan mode, a presence-confidence metric indicative of exposure to ionizing-radiation; and
- compute, in the fine-scan mode, a traveling direction of an ionizing-radiation source.

In another example, the sensing unit 100 may be configured to select an active mode from a group of modes comprising at least a coarse-scan mode and a fine-scan mode and, based at least in part on the antenna response data:

- compute, in the coarse-scan mode, a first estimate of a presence-confidence metric indicative of exposure to ionizing-radiation and, a first estimate of a traveling direction of an ionizing-radiation source;
- compute, in the fine-scan mode, a second estimate of a presence-confidence metric indicative of exposure to ionizing-radiation and, a second estimate of a traveling direction of an ionizing-radiation source.

In one example, the receiver antenna 120 and/or transmitter antenna 110 is realized as a stacked LTCC microstrip radiator 111, 121 integrated into a multilayer module. The multilayer module may then also accommodate the feed network and shielding.

LTCC may refer to a multilayer ceramic process where ceramic tapes and conductive pastes are co-fired at relatively low temperatures (~850° C.), enabling the integration of conductors (Ag, Au, Cu), dielectric layers, and even passive components into a compact, hermetically sealed structure. This process may produce substrates with stable dielectric properties (er≈5-10), low loss tangent, and excellent dimensional precision, which are ideal for fabricating microstrip patch and array antennas in the GHz range. From an environmental perspective, LTCC structures are highly resistant to temperature extremes, humidity, dust, and radiation exposure, making them suitable for operation in harsh outdoor conditions typical of Nuclear Power Plant (NPP) sites. LTCC technology is typically adopted in scenarios where stability under mechanical vibration and wide thermal cycles is critical. LTCC may be especially beneficial within the application of nuclear instrumentation and sensors, particularly where radiation hardness and long-term stability are required (e.g., monitoring electronics deployed in reactor containment areas or radiation detection modules). Incorporating LTCC based antennas in the sensing unit 100 may ensure that the sensing unit 100 can be miniaturized, ruggedized, and integrated with thin-film radiation-sensitive coatings without compromising performance. The hermetic and multilayer nature of LTCC substrates may also allow for integration of shielding layers, feed networks, and even embedded reference antennas within a single module, which is particularly advantageous for field deployment in hot and dusty climate as well as in potential nuclear emergency scenarios.

The radiation-sensitive material may refer to materials that interact with nuclear particles and photons. Examples of the radiation-sensitive material include scintillator-based coatings such as ZnS:Ag, LYSO:Ce, or GAGG:Ce which can absorb α, β, and γ radiation, these may produce secondary charge carriers or photons that increase the dielectric loss seen by the antenna. Radiation-sensitive material including neutron-sensitive films such as boron carbide ($B_4C$), boron nitride (BN), LiF:ZnS composites, or gadolinium oxide ($Gd_2O_3$) can capture neutrons and generate charged secondaries, likewise modifying the local permittivity and conductivity. Radiation-sensitive material such as heavy metal oxides like $Bi_2O_3$, PbO, or $WO_3$ can be added to enhance γ-ray absorption due to their high atomic number, while organic semiconductors or conductive polymers such as polyaniline or PEDOT:PSS can change conductivity under ionizing-radiation exposure. These coatings, typically applied in the range of 100 nm to tens of micrometers, may be concentrated at the high-field regions of the antenna to maximize sensitivity In some examples, the sensing unit 100 may be configured to, e.g., in the coarse-scan mode, compute one or more characteristics of the antenna response data, including at least one of: gain attenuation, beamwidth deviation, polarization-state deviation, global power-density reduction, and to derive, based thereon, the presence-confidence metric.

In some examples, the sensing unit 100 may be configured to, e.g., in the fine-scan mode, compute one or more characteristics of the antenna response data including at least one of: beam-pointing deviation, lobe asymmetry/deformation, phase-front tilt, and to derive, based thereon, the traveling direction of an ionizing-radiation source.

Antenna response data may be indicative of one or more characteristics of the far-field radiation pattern, i.e., a characteristic derived from the received signal of the receiver antenna, such as:

- Gain attenuation, arising from increased loss or reduced radiation efficiency;
- Beamwidth deviation, including unexpected broadening or narrowing as the aperture field distribution is modified;
- Polarization-state deviation, e.g., depolarization or shifts toward elliptical/circular polarization due to anisotropic or non-uniform material response; and
- Global power-density reduction, observed as decreased spatially integrated power in the far-field;
- Beam-pointing deviation (main-lobe squint or steering);
- Lobe asymmetry/deformation, including side-lobe level changes and pattern skew; and
- Phase-front tilt, indicative of phase pattern gradients across the effective aperture.

Material integration choices may influence the magnitude and signature of these effects. For example, applying the radiation-sensitive material as a coating at high-field regions of the radiator 111 can increase sensitivity, whereas excessive thickness or non-uniform coatings may detune the antenna 110, reduce efficiency, and introduce beam asymmetries even absent radiation exposure. Hygroscopic or environmentally sensitive materials may further modulate polarization and pattern stability unless encapsulated.

The foregoing far-field characteristics may be frequency-dependent, as the operating RF band and material dispersion may set the balance between loss and permittivity perturbations. In multilayer embodiments (e.g., LTCC modules with optional shielding or embedded feeds), the unirradiated baseline pattern may differ from conventional substrates; the radiation-induced deltas are nevertheless observable relative to a reference baseline established under baseline conditions.

In some implementations, additional observables that correlate with far-field changes—such as resonant-frequency shift and return-loss variation—may be monitored concurrently by the sensing unit 100 as auxiliary indicators, while the receiver antenna 120 provides the received signal indicative of the far-field characteristics. Environmental data (e.g., temperature, wind, humidity) may be utilized for pre-processing and compensation to reduce weather-driven confounders, improving derivation of the presence-confidence metric and, where applicable, estimation of a traveling direction of an ionizing-radiation source from the antenna response data.

In some examples, the sensing unit 100 may be configured to, responsive to the presence-confidence metric exceeding a threshold in the coarse-scan mode, select the fine-scan mode as the active mode.

In some examples, the sensing unit, e.g., the control circuitry 130 and/or receiver antenna 120 may be configured to pre-process the received signal and/or antenna response data by at least one of: normalization, temperature or humidity compensation, or rotation-angle registration.

In some examples, the sensing unit 100 may be configured to execute a baseline-establishment routine comprising acquiring antenna response data under a baseline condition and deriving therefrom at least one reference baseline stored in a memory operatively coupled to the sensing unit 100.

In some examples, the sensing unit 100 may further comprise an environmental sensor providing environmental data indicative of at least one of temperature, wind and/or humidity.

In some examples, the sensing unit 100 may be configured to implement, individually or in any combination, one or more inference strategies selected from: (i) baseline comparison using one or more reference baselines, (ii) model-based inference using a parameterized mapping whose parameters are obtained by training, and (iii) configurable rule-based inference using thresholds, decision logic, or look-up tables.

In some examples, the sensing unit 100 may supply the antenna response data or a computed characteristics thereof to a machine-learning model and, depending on the active mode, obtains therefrom at least one of the presence-confidence metric or the traveling direction.

In some examples, the sensing unit 100 may supply the antenna response data or a characteristic derived therefrom to a machine-learning model and obtains the traveling direction therefrom.

In some examples, the sensing unit 100 may supply the antenna response data or a characteristic derived therefrom a machine-learning model and obtains the traveling direction therefrom.

In some examples, the machine-learning model may be trained using antenna response data or a characteristic derived therefrom acquired during the baseline-establishment routine and, optionally, further using environmental data.

In some examples, the radio-frequency transmitter antenna 110 may comprise an angular position sensor operable to output instantaneous rotational angle of the radiator 111 during the measurement interval.

In some examples, the sensing unit 100 may comprise a timing module configured to time-stamp antenna response data according to a clock synchronized with the angular position sensor.

In some examples, the receiver antenna 120 may comprise at least one radiator 121 that: is not outfitted with any radiation-sensitive material; non-rotational; and, arranged in the far-field of the transmitter antenna 110.

In some examples, the sensing unit 100 may be configured to, in the coarse-scan mode, acquire antenna response data with a first angular sampling density and, in the fine-scan mode, acquire antenna response data with a second angular sampling density that is at least k times the first, wherein k is at least e.g., 2.

In some examples, the angular sampling density may be defined as a number of angular bins per 360° used by the sensing unit 100 to accumulate time-stamped samples indexed by an instantaneous rotational angle of the radiator 111.

In some examples, in the coarse-scan mode, the sensing unit 100 may partition antenna response data into angular bins of width $\Delta\varphi_1$ and, in the fine-scan mode, into angular bins of width $\Delta\varphi_2$, with $\Delta\varphi_2$-$\Delta\varphi_1/k$, where e.g., $k \geq 2$.

In some examples, the sensing unit 100 may be configured to select at least one of: (i) angular bin width and (ii) per-bin coherent integration time and/or commanded angular velocity such that an effective angular sampling density in the fine-scan mode is at least k times an effective angular sampling density in the coarse-scan mode, where e.g., $k \geq 2$.

In some examples, the sensing unit 100 may be configured to transition from the coarse-scan mode to the fine-scan mode when a confidence metric for presence detection exceeds a first threshold, and to transition from the fine-scan mode to the coarse-scan mode when the confidence metric falls below a second, lower threshold In some examples, the sensing unit 100 may be configured to command the rotation drive 114 to rotate the radiator 111 of the transmitter antenna 110 in angular increments of $\Delta\theta_1$ in the coarse-scan mode and $\Delta\theta_2$ in the fine-scan mode, with $\Delta\theta_2 \leq \Delta\theta_1$.

In some examples, in the fine-scan mode, the sensing unit 100 may be configured to halt rotation at a candidate azimuth for a dwell interval to increase coherent integration, the candidate azimuth being derived from perturbation characteristics of the far-field radiation pattern.

In some examples, the sensing unit 100 comprises at least two transmitter antennas 110 (e.g., 110*a*, 110*b*) and a single receiver antenna 120. Each transmitter antenna 110 may include a radiator that is rotated about a rotation axis by a rotation drive. At least a portion of the radiator may comprise a radiation-sensitive material such that exposure to ionizing radiation perturbs a far-field radiation pattern emitted by the radiator during rotation. In further examples, the control circuitry may be configured to excite the transmitter antennas 110*a*, 110*b* in time-division and/or with mutually orthogonal waveforms (e.g., distinct PN sequences, frequency slots, or polarizations) while the receiver antenna 120 may provide a received signal indicative of the far-field radiation pattern. The control circuitry may associate each segment of the received signal with a corresponding transmitter antenna and rotor angle (using an angular position sensor and timestamps), thereby generating antenna response data for each transmitter antenna 110.

In other examples, the sensing unit 100 may comprise a single transmitter antenna 110 and at least two receiver antennas 120 (e.g., 120*e*1, 120*e*2). The transmitter antenna 110 includes a rotating radiator having a radiation-sensitive material as described above, such that ionizing radiation perturbs the far-field pattern during rotation. The receiver antennas 120*e*1, 120*e*2 may be spatially separated (e.g., by a known baseline and/or with different heights or polarizations) to provide reception diversity and optional two-element interferometry. In further examples, during operation, the control circuitry 130 may cause the transmitter antenna 110 to radiate while acquiring respective received signals from 120*e*1 and 120*e*2. The control circuitry 130 may generate antenna response data per receiver 122*e*1, 122*e*2 and optionally performs diversity combining (e.g., selection combining or maximal ratio combining) and/or phase/time-difference processing across the receivers to reduce fading and to estimate an angle-of-arrival of pattern perturbations correlated with rotor angle. Based at least in part on the combined antenna response data, the control circuitry 130 may compute a presence-confidence metric and, when applicable, a traveling direction of an ionizing-radiation source. Optional calibration routines may include baseline characterization with the transmitter 110 rotating in a known radiation-free condition and per-receiver normalization for temperature, humidity, and wind.

Figure 4:
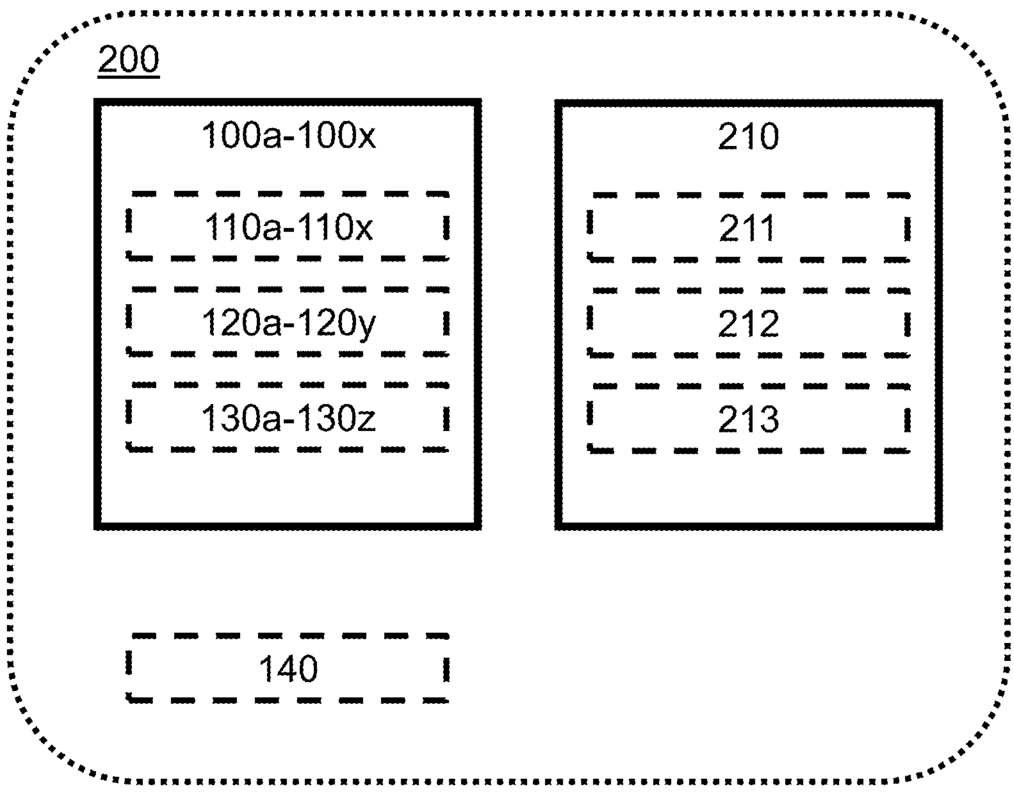
FIG. 4 is a block diagram of an example system having a plurality of sensing units, a central controller, environmental sensors, and optional components relating thereto.

FIG. 4 is a block diagram of an example system 200 comprising a plurality of sensing units 100*a*-100*x*. Each transmitter antenna 110*a*-110*x* and corresponding receiver antenna 120*a*-120*y* forming an antenna pair. Each transmitter antenna 110*a*-110*x* may be associated with a geospatial location. The plurality of antenna pairs being geographically distributed and communicatively coupled to a central controller 210 including at least one processor 211 and non-transitory memory 212 storing instructions. The system 200 may incorporate the same sensing unit as described in relation to FIG. 1 or FIG. 3. The system 200 may be configured to:

obtain, from each receiver antenna 120*a*-120*y*, a received signal indicative of the far-field radiation pattern emitted by corresponding transmitter antenna;

generate, for each received signal, antenna response data indicative of one or more characteristics of the far-field radiation pattern;

compute a local presence-confidence metric and/or a local traveling direction of an ionizing-radiation source for respective antenna pair among the plurality of antenna pairs;

associate respective local presence-confidence metric and/or a local traveling direction of an ionizing-radiation source with a geospatial location.

In some examples, each transmitter antenna 110*a*-110*x* and receiver antenna 120*a*-120*y* of the plurality of sensing units are identical or nominally identical in RF design and mechanical configuration and/or are cross-calibrated to a common baseline. This may enable for direct comparability of antenna response data and characteristics derived therefrom across nodes. The system 200 may maintain node-specific baselines and normalization factors to accommodate manufacturing tolerances, environmental drift, and aging.

In some examples, the system 200 is further configured to:

select an active mode from a group of modes comprising at least a coarse-scan mode and a fine-scan mode for each antenna pair;

obtain a local presence-confidence metric exceeding a threshold associated with a detecting antenna pair among the plurality of antenna pairs;

select the fine-scan mode as the active mode for at least two antenna pairs of the plurality of antenna pairs comprising at least the detecting antenna pair.

In some examples, respective the central controller 210 may include a memory 212 storing instructions for performing computations or transmitting control commands recited in relation to aforementioned examples related to the sensing unit 100 described in relation to FIGS. 1 and 3.

In some examples, the central controller 210 may be implemented as a computing system separate from the control circuitry 130 of each sensing unit 100 among the plurality of sensing units 100*a*-100*x*. For example, a centralized architecture may be employed in which the control circuitry 130 each sensing unit 100 performs pre-processing (e.g., filtering, timestamping, geospatial tagging) and transmits a received signal or a characteristic derived therefrom to the system 200, which is configured to perform baseline establishment and normalization, feature extraction (antenna response data or characteristics derived therefrom), computation of a presence-confidence metric, data fusion, and tasking (including activation of fine-scan mode).

In other examples, a distributed architecture may be employed in which the control circuitry 130 of each sensing unit 100 among the plurality of sensing units 100*a*-100*x* cooperatively perform some or all of the foregoing central controller operations, thereby forming a logical system over peer-to-peer and/or multi-hop (mesh) links.

In further examples, a hybrid partition may be used, with selected computations performed locally at the sensing units 100*a*-100*x* and remaining computations performed by a separate system. The sensing units 100*a*-100*x* and the central controller 210 may be communicatively coupled directly or indirectly via one or more networks, which may include peer-to-peer inter-unit links, hub-and-spoke links, and wide-area backhaul such as cellular, private radio, Wi-Fi, wired, LPWAN, and/or satellite links, without limiting the broader scope.

In some examples, the plurality of sensing units 100*a*-100*x* may include any number of transmitter antennas 110*a*-110*x*, which may be fewer than, equal to, or greater than the number of receiver antennas 120*a*-120*y* and/or control circuitry 130*a*-130*z*, whether per unit and/or in aggregate across the array. Counts and allocations may be deployment-dependent and non-limiting.

In some examples, the system 200 may comprise environmental sensors 140 providing environmental data indicative of at least one of temperature, wind and humidity. The system 200 may then be configured to determine the traveling direction of the ionizing-radiation source based at least in part on the environmental data.

In some examples, the sensing units 100*a*-100*x* may be arranged around a monitored facility 220 according to a placement plan forming a monitored area.

In some examples, the plurality of sensing units 100*a*-100*x* are deployed according to a placement plan including deployment on fixed ground locations (e.g., facility perimeters, rooftops, masts), on mobile platforms (e.g., unmanned aerial vehicles (UAVs), autonomous ground vehicles, manned vehicles), or as a hybrid thereof. Each sensing unit 100, or a transmitter antenna 110 thereof, may report its geospatial location; for mobile platforms this may include GNSS-derived position and attitude, enabling the system 200 to register antenna response data to a common reference frame.

By distributing the plurality of sensing units 100*a*-100*x* across multiple positions (fixed and/or mobile), the system 200 may fuse the antenna response data or characteristics derived thereof to estimate or reconstruct plume attributes-including, without limitation, presence, shape, extent, centroid, gradients, isodose contours, and traveling direction and/or velocity.

Upon receipt of a presence-confidence metric exceeding a threshold from a detecting antenna pair, the system 200 may activate a fine-scan mode for a plurality of nearby sensing units 100*a*-100*x* and/or retask mobile platforms to increase angular and spatial sampling density in a region of interest.

In some examples, the placement plan may be derived from a risk analysis derived at least in part from historical data selected from: recorded ionizing-radiation incident logs, scheduled and unscheduled maintenance/outage records, facility layout or shielding changes, meteorological archives (including wind roses), and plant operating-state logs, the historical data being used to compute zone-specific risk weights for the placement plan.

In some examples, the placement plan may be derived from a risk analysis obtained from one or more predictive models to estimate a spatial risk distribution for the monitored facility; preferably the predictive models comprise a physics-informed neural network (PINN) constrained by transport/dispersion physics and trained on historical and/or simulated data.

In some examples, the placement plan referenced in is computed using statistical or information-theoretic optimization to select deployment locations for fixed sensing units 100*a*-100*x* and/or assign survey paths for mobile sensing units 100*a*-100*x*, for example using Monte Carlo sampling, greedy selection, convex relaxations, or criteria maximizing mutual or Fisher information subject to power, communications, and airspace constraints. The placement plan may be generated a priori from historical data and predictive models and adaptively refined in operation based at least in part on environmental data and incoming antenna response data.

In some examples, the system 200 may be further configured to estimate a spatial distribution of ionizing-radiation intensity emitted by the ionizing-radiation source.

In some examples, estimating the spatial distribution comprises formulating and solving an inverse problem over a monitored area using antenna response data or a characteristic derived therefrom acquired from a plurality of antenna pairs.

In some examples, the system 200 is further configured to:

obtain at least one local traveling direction of the ionizing-radiation source associated with at least one detecting antenna pair among the plurality of antenna pairs;

compute a spatial distribution of ionizing-radiation intensity emitted by the ionizing-radiation source based on the at least one local traveling direction associated with at least one detecting antenna pair among the plurality of antenna pairs.

In some examples, the local traveling directions may be associated with a velocity, and optionally an acceleration. The system 200 may then be configured to predict a future spatial distribution of ionizing-radiation intensity. For example, the system 200 may be configured to:

obtain at least one local traveling direction of the ionizing-radiation source associated with at least one detecting antenna pair among the plurality of antenna pairs;

estimate a velocity and/or acceleration for each of the at least one local traveling direction;

predict a future spatial distribution of ionizing-radiation intensity emitted by the ionizing-radiation source based, at least in part, on the estimated velocity and/or acceleration of the at least one local traveling direction.

Based on the predicted future spatial distribution, the system 200 may proactively command one or more sensing units 100*a*-100*x* (including the detecting antenna pair and nearby pairs) to enter fine-scan mode and/or retask mobile platforms to increase sampling density along the forecast plume path.

In some examples, the future spatial distribution of ionizing-radiation intensity may be predicted using a machine learning model. In further examples, the machine learning model is a physics-informed neural network constrained by dispersion physics and trained on historical and/or simulated data.

In some examples, the future spatial distribution of ionizing-radiation intensity may be predicted based at least in part on environmental data.

Figures 5, 6:
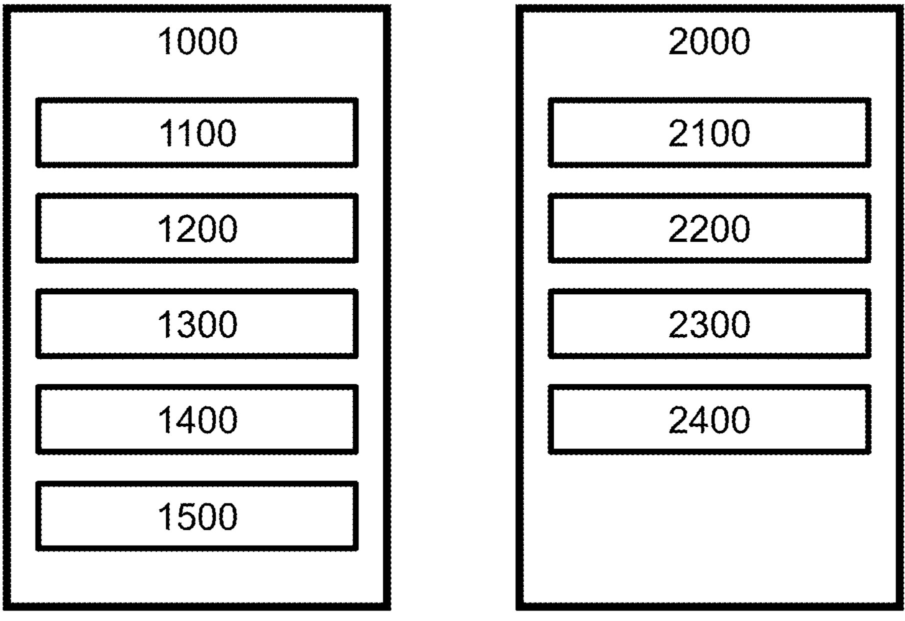
FIG. 5 is a flow-chart illustrating an example method for localizing ionizing-radiation using a transmitter antenna and receiver antenna pair.
FIG. 6 is a flow-chart illustrating an example method for mapping ionizing-radiation using a system comprising a plurality of transmitter antenna and receiver antenna pairs.

FIG. 5 is a flow-chart illustrating an example method 1000 for detecting ionizing-radiation according to this disclosure. Method 1000 may be performed, for example, by the sensing unit 100, as described with reference to FIGS. 1 and 3. The example method 1000 in FIG. 5 comprises:

Rotating 1100, by rotation drive of a transmitter antenna, at least one radiator about a rotation axis, wherein at least one of the at least one radiator is, at least in part, coated with a radiation-sensitive material;

Emitting 1200, by the radio-frequency transmitter antenna, a far-field radiation pattern;

receiving 1300, at a radio-frequency receiver antenna, a received signal indicative of the far-field radiation pattern emitted by the transmitter antenna, wherein exposure of the radiation-sensitive material to ionizing-radiation perturbs the far-field radiation pattern;

generating 1400 antenna response data indicative of one or more characteristics of the far-field radiation pattern based on the received signal;

computing 1500 a presence-confidence metric indicative of exposure to ionizing-radiation and/or a traveling direction of an ionizing-radiation source.

The method 1000 may be implemented by a sensing unit 100 such as described with reference to FIG. 1 and FIG. 3, any may further include one or more of the operations described in relation thereto. For example the method may further include any of: (i) selecting an active mode chosen from a coarse-scan mode and a fine-scan mode; (ii) in the coarse-scan mode, computing a first estimate of one or both of: a presence-confidence metric indicative of exposure to ionizing-radiation and a traveling direction of an ionizing-radiation source; (iii) responsive to the presence-confidence metric exceeding a threshold, transitioning to the fine-scan mode and computing refined estimates; (iv) executing a baseline-establishment routine that acquires antenna response data under baseline conditions and derives one or more reference baselines and normalization factors; (v) extracting antenna response data or a characteristic derived therefrom—including by way of non-limiting example gain attenuation, beamwidth deviation, polarization-state deviation, global power-density reduction, beam-pointing deviation, lobe asymmetry or deformation, and phase-front tilt—and deriving the presence-confidence metric and/or the traveling direction from such characteristics; (vi) operating the rotation drive according to a scan schedule associated with the active mode to set angular sampling density; (vii) ingesting environmental data (e.g., temperature, wind, humidity) provided by a local or remote environmental sensor to compensate or refine the presence-confidence metric and/or the traveling direction; (viii) supplying the antenna response data and/or extracted characteristics to a trained machine-learning model to obtain one or both of the presence-confidence metric and the traveling direction, the model optionally being trained using data acquired during the baseline-establishment routine; and (ix) time-stamping and geospatially tagging the antenna response data, extracted characteristics, and computed outputs. The foregoing operations may be performed in any practicable order, may be iterated, and may be partitioned between the sensing unit and a remote controller in centralized, distributed, or hybrid architectures.

FIG. 6 is a flow-chart illustrating an example method 2000 for detecting ionizing-radiation according to this disclosure. Method 2000 may be performed, for example, by the system 200, as described with reference to FIGS. 2 and 4.

FIG. 6 illustrates a method 2000 implemented a system comprising a plurality of geographically distributed antenna pairs communicatively coupled to a central controller including at least one processor and non-transitory memory storing instructions, each antenna pair including a radio-frequency transmitter antenna and a corresponding radio-frequency receiver antenna, the transmitter antenna having a rotation drive configured to rotate a radiator about a rotation axis and at least a portion of the radiator being coated with a radiation-sensitive material whose exposure to ionizing-radiation perturbs a far-field radiation pattern of the transmitter antenna, the method comprising:

obtaining 2100, from each receiver antenna, a received signal indicative of the far-field radiation pattern emitted by corresponding transmitter antenna;

generating 2200, for each received signal, a set of antenna response data indicative of one or more characteristics of the far-field radiation pattern;

computing 2300, for each set of antenna response data associated with respective received signal, a local presence-confidence metric and/or a local traveling direction of an ionizing-radiation source;

associating 2400 respective local presence-confidence metric and/or a local traveling direction of an ionizing-radiation source with a geospatial location.

The method 2000 may be implemented by a system 200 such as described with reference to FIG. 2 and FIG. 4, any may further include one or more of the operations described in relation thereto. For example the method 2000 may further include any of: (i) cross-calibrating antenna pairs to a common baseline and maintaining node-specific baselines and normalization factors to enable direct comparability of antenna response data; (ii) selecting, for each antenna pair, an active mode chosen from a coarse-scan mode and a fine-scan mode; (iii) determining that a detecting antenna pair produced a local presence-confidence metric that exceeds a threshold and, in response, activating the fine-scan mode for the detecting antenna pair and at least one additional antenna pair; (iv) extracting antenna response data or a characteristic derived therefrom and computing, for each antenna pair, a local presence-confidence metric and/or a local traveling direction; (v) associating each local metric and/or local traveling direction with a geospatial location of the corresponding antenna pair, including GNSS-derived position and attitude for mobile platforms; (vi) fusing local metrics and/or local traveling directions across antenna pairs to compute a network-level presence-confidence metric and/or to estimate a spatial distribution of ionizing-radiation intensity over a monitored area, including by formulating and solving an inverse problem using measurements from multiple antenna pairs; (vii) integrating environmental data (e.g., temperature, wind, humidity) to refine the estimated traveling direction and/or the estimated spatial distribution; (viii) estimating, for one or more local traveling directions, a velocity and optionally an acceleration and using such estimates—optionally with a machine-learning model such as a physics-informed neural network constrained by transport/dispersion physics trained on historical and/or simulated data—to predict a future spatial distribution of ionizing-radiation intensity; and (ix) tasking sensing units based on a computed or predicted distribution, including activating fine-scan modes and/or retasking mobile platforms to increase angular and spatial sampling density in a region of interest. The foregoing may be performed in any practicable order, may be iterated, and may be executed in centralized, distributed, or hybrid partitions over peer-to-peer, hub-and-spoke, and/or wide-area backhaul links.

As used herein, the term control circuitry may refer to any hardware, firmware, or combination of hardware and software that is configured to perform the computations and control operations described. A control circuitry may be realized as, for example, a general-purpose processor (CPU), a microcontroller (MCU), a digital signal processor (DSP), a field-programmable gate array (FPGA), an application-specific integrated circuit (ASIC), or other programmable logic device. The control circuitry may execute instructions stored in a non-transitory computer-readable medium, such as a memory, to perform its functions. These functions can include selecting an active scan mode, computing metrics and characteristics from antenna response data, executing baseline routines, and implementing various inference strategies.

As used herein, the term central controller may refer to a logical entity communicatively coupled to a plurality of sensing units and configured to perform system-level operations. Such operations may include obtaining data from each antenna pair, determining a geospatial location or traveling direction of an ionizing-radiation source, activating fine-scan modes across multiple units, and estimating a spatial distribution of radiation intensity. The central controller is a functional concept and its implementation may vary. For example, it can be implemented as a separate, centralized computing system, or its functions can be performed in a distributed manner by the control circuitry of the individual sensing units operating cooperatively. A hybrid architecture, where some computations are performed locally at the sensing units and others are performed by a separate central system, is also contemplated.

As used herein, the term rotation drive may refer to a mechanism or control subsystem configured to impart and/or regulate relative angular motion of at least a portion of the sensing unit (e.g., a transmitter antenna) about one or more axes, and optionally to provide command, feedback, and timing for angular position, velocity, acceleration, and dwell; examples include stepper/servo/BLDC motor drives, gear or belt trains, gimbals, and rotary stages, as well as embedded controllers that coordinate such actuators.

As used herein, the traveling direction of an ionizing-radiation source may be resolved in a local East-North-Up (ENU) frame fixed at the receiver site. The direction may be expressed as azimuth θ_E (degrees clockwise from true north) and, when available, elevation φ_E (degrees above the local horizon). When only azimuth is determinable, the direction may be reduced to θ_E, with the ground-track unit vector u= [cos θ_E, sin θ_E, 0] in ENU. For convenience, an antenna-fixed azimuth θ_A may also be reported via θ_A=wrap (θ_E−ψ), where y is the transmitter's yaw (rotation axis orientation) relative to true north.

As used herein, the term ionizing-radiation source may refer to any radiation-emitting object or medium, including (i) compact emitters (sealed sources, reactor cores, canisters) and (ii) distributed emitters such as radioactive plumes. For a distributed ionizing-radiation source, traveling direction may refer to the bulk transport (advection) of the emitting medium; for a compact ionizing-radiation source, the system may instead compute a bearing (azimuth/elevation) to the emitter. Radioactive plume may refer to a distributed, radiation-emitting medium (air/water) containing radionuclides.

As used herein, the presence-confidence metric C∈[0,1] may quantify the probability-like confidence that an ionizing-radiation source is present, e.g., given a feature vector f extracted from antenna-response data (e.g., gain drop ΔG, beamwidth change ΔBW, boresight tilt Δθ). In examples, a log-likelihood ratio $l(f)=\log p(f|H_1)-\log p(f|H_0)$ may be computed using Gaussian models calibrated during baseline collection, and C is obtained by a logistic mapping C=1/(1+e^{−l(f)}). A ionizing-radiation source may be declared present when C≥τ(e.g., τ=0.80), with t selected via ROC analysis on held-out validation data.

As used herein, the term baseline condition may refer to a reference operational state in which antenna response data are expected to be substantially free of target-radiation effects (or otherwise representative of a defined reference dose rate or activity level), optionally specified per device, frequency band, polarization, and/or angular bin and under stated environmental ranges.

As used herein, the term reference baseline may refer to a data structure or model (e.g., tables, maps, parameter sets, or learned functions) characterizing expected antenna response behavior under the baseline condition, optionally indexed by one or more of angle, frequency, polarization, time, and environmental inputs, and used to compute deviations, residuals, thresholds, or confidence metrics during operation.

As used herein, the term baseline-establishment routine may refer to any calibration or initialization process by which a reference baseline is created and/or updated, which may include collection of time-stamped antenna response data, outlier rejection, environmental compensation, smoothing or filtering, parameter fitting, and optionally periodic or event-driven re-estimation with hysteresis or quality-of-fit gating.

As used herein, the term machine-learning model may refer to any trainable computational model that maps inputs (e.g., raw or pre-processed antenna response data and/or engineered features and environmental inputs) to outputs (e.g., presence confidence, direction, plume parameters), including without limitation supervised, unsupervised, semi-supervised, reinforcement, ensemble, and physics-informed models (e.g., neural networks, gradient-boosted trees, kernel methods, probabilistic graphical models), along with their learned parameters and inference procedures.

As used herein, the term environmental sensor may refer to any sensor configured to measure exogenous variables that can influence antenna response and/or are used for compensation or inference, including by way of example temperature, humidity, barometric pressure, wind speed/direction, precipitation, ambient light, vibration/IMU, electromagnetic interference indicators, and geospatial/attitude sources (e.g., GNSS, compass).

As used herein, the term environmental data may refer to data representing environmental measurements or context available to the system, including outputs of environmental sensors and/or external feeds (e.g., weather services, facility telemetry), optionally time- and location-stamped and formatted for use in pre-processing, baseline estimation, compensation, thresholding, or higher-level inference.

It may be appreciated that the Figures, such as FIG. 1, 2, 3, 4, 5, 6 comprise some features, circuitries, or operations which are illustrated with a solid line and some features, circuitries, or operations which are illustrated with a dashed line. Features, circuitries, or operations which are comprised in a solid line are features, circuitries, or operations which are comprised in at least one of the broadest example embodiments. Features, circuitries, or operations which are comprised in a dashed line are example embodiments which may be comprised in, or a part of, or are further features, circuitries, or operations which may be taken in addition to the solid line example embodiments. It should be appreciated that these operations need not be performed in order presented. Furthermore, it should be appreciated that not all of the operations need to be performed. The example operations may be performed in any order and in any combination. Further, the claims may not recite all features or combinations disclosed herein. This disclosure, taken as a whole, describes examples and embodiments that may not be claimed herein but to which the applicant is entitled, and which may be the subject of related applications.

It is to be noted that the word "comprising" does not necessarily exclude the presence of other elements or steps than those listed.

It is to be noted that the words "a" or "an" preceding an element do not exclude the presence of a plurality of such elements.

It is to be noted that a list in the form of "at least one of A, B, or C, or any combination thereof" should be understood to mean "A", or "B", or "C", or "A and B", or "A and C", or "B and C", or "A and B and C".

It is to be noted that the term "indicative of" may be seen as "associated with", "related to", "descriptive of", "characterizing", and/or "defining". The terms "indicative of", "associated with", "related to", "descriptive of", "characterizing", and "defining" can be used interchangeably. The term "indicative of" can be seen as indicating a relation. For example, weight data indicative of weight may comprise one or more weight parameters.

It is to be noted that the word "based on" may be seen as "as a function of" and/or "derived from". The terms "based on" and "as a function of" can be used interchangeably. For example, a parameter determined "based on" a data set can be seen as a parameter determined "as a function of" the data set. A parameter or action may be determined or performed "based on" multiple inputs, items, or predicates. For example, a parameter or action may be "based at least in part on" a first input and "based at least in part on" a second input, which may or may not be expressly recited or claimed. In other words, the parameter may be an output of one or more functions with multiple inputs, including the data set as an input.

A function may be characterizing a relation between an input and an output, such as mathematical relation, a database relation, a hardware relation, logical relation, and/or other suitable relations.

It should further be noted that any reference signs do not limit the scope of the claims, that the example embodiments may be implemented at least in part by means of both hardware and software, and that several "means", "units" or "devices" may be represented by the same item of hardware.

The various example methods, devices, nodes and systems described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program circuitries may include routines, programs, objects, components, data structures, etc. that perform specified tasks or implement specific abstract data types. Computer-executable instructions, associated data structures, and program circuitries represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed disclosure, and it will be made obvious to those skilled in the art that various changes and modifications may be made without departing from the scope of the claimed disclosure. The specification and drawings are, accordingly, to be regarded in an illustrative rather than restrictive sense. The claimed disclosure is intended to cover all alternatives, modifications, and equivalents

What is claimed is:

1. A sensing unit comprising:

a radio-frequency transmitter antenna outfitted with a radiation-sensitive material such that exposure to ionizing-radiation perturbs a far-field radiation pattern of the transmitter antenna, wherein the transmitter antenna comprises a rotation drive arranged to rotate a radiator of the transmitter antenna about a rotation axis;

a radio-frequency receiver antenna configured to provide a received signal based on the far-field radiation pattern emitted by the transmitter antenna, control circuitry including at least one processor and non-transitory memory storing instructions;

wherein the sensing unit is configured to generate antenna response data based on the received signal from the receiver antenna, and to compute, based at least in part on the antenna response data, at least one of a presence-confidence metric indicative of exposure to ionizing-radiation and/or a traveling direction of an ionizing-radiation source; and wherein the sensing unit is configured to select an active mode from a group of modes comprising at least a coarse-scan mode and a fine-scan mode and, wherein the sensing unit is further configured to, responsive to the presence-confidence metric exceeding a threshold in the coarse-scan mode, select the fine-scan mode as the active mode.

2. The sensing unit of claim 1, wherein the sensing unit is configured to select an active mode from a group of modes comprising at least a coarse-scan mode and a fine-scan mode and wherein the rotation drive is configured to rotate the radiator of the transmitter antenna about the rotation axis in accordance with the active mode.

3. The sensing unit of claim 1, wherein the sensing unit is configured to select an active mode from a group of modes comprising at least a coarse-scan mode and a fine-scan mode and, based at least in part on the antenna response data:

compute, in the coarse-scan mode, a presence-confidence metric indicative of exposure to ionizing-radiation; and compute, in the fine-scan mode, a traveling direction of an ionizing-radiation source.

4. The sensing unit of claim 1, wherein the sensing unit is configured to select an active mode from a group of modes comprising at least a coarse-scan mode and a fine-scan mode and, based at least in part on the antenna response data:

compute, in the coarse-scan mode, a first estimate of a presence-confidence metric indicative of exposure to ionizing-radiation and, a first estimate of a traveling direction of an ionizing-radiation source;

compute, in the fine-scan mode, a second estimate of a presence-confidence metric indicative of exposure to ionizing-radiation and, a second estimate of a traveling direction of an ionizing-radiation source.

5. The sensing unit of claim 1, wherein the radiation-sensitive material is disposed as a coating on at least a part of at least one rotating radiator of the transmitter antenna.

6. The sensing unit of claim 1, wherein the sensing unit is configured to compute one or more of: gain attenuation, beamwidth deviation, polarization-state deviation, global power-density reduction, beam-pointing deviation, lobe asymmetry/deformation, phase-front tilt, and to derive, based thereon, the presence-confidence metric or the traveling direction of an ionizing-radiation source.

7. The sensing unit of claim 1, wherein the sensing unit is configured to execute a baseline-establishment routine comprising acquiring antenna response data under a baseline condition and deriving therefrom at least one reference baseline.

8. The sensing unit of claim 1, further comprising an environmental sensor providing environmental data indicative of at least one of temperature, wind and/or humidity.

9. The sensing unit of claim 1, wherein the sensing unit supplies the antenna response data or a computed characteristics thereof to a machine-learning model and, obtains therefrom at least one of the presence-confidence metric and/or the traveling direction of an ionizing-radiation source.

10. The sensing unit of claim 9, wherein the sensing unit is configured to execute a baseline-establishment routine comprising acquiring antenna response data under a baseline condition and deriving therefrom at least one reference baseline, and wherein the machine-learning model is trained using antenna response data acquired during the baseline-establishment routine.

11. A system comprising a plurality of sensing units of claim 1, each transmitter antenna and corresponding receiver antenna forming an antenna pair, wherein each transmitter antenna is associated with a geospatial location, the plurality of antenna pairs being geographically distributed and communicatively coupled to a central controller including at least one processor and non-transitory memory storing instructions, wherein the system is configured to:

obtain, from each receiver antenna, a received signal indicative of the far-field radiation pattern emitted by corresponding transmitter antenna;

generate, for each received signal, antenna response data indicative of one or more characteristics of the far-field radiation pattern;

compute at least one of a local presence-confidence metric and/or a local traveling direction of an ionizing-radiation source for respective antenna pair among the plurality of antenna pairs;

associate at least one of respective local presence-confidence metric and/or a local traveling direction of an ionizing-radiation source with a geospatial location.

12. The system of claim 11, comprising an environmental sensor providing environmental data indicative of at least one of temperature, wind and/or humidity, and wherein the system is configured to determine the traveling direction of the ionizing-radiation source based at least in part on the environmental data.

13. The system of claim 11, wherein the system is further configured to:

obtain at least one local traveling direction of the ionizing-radiation source associated with at least one detecting antenna pair among the plurality of antenna pairs;

compute a spatial distribution of ionizing-radiation intensity emitted by the ionizing-radiation source based on the at least one local traveling direction associated with at least one detecting antenna pair among the plurality of antenna pairs.

14. The system of claim 11, wherein the system is further configured to:

obtain at least one local traveling direction of the ionizing-radiation source associated with at least one detecting antenna pair among the plurality of antenna pairs;

estimate at least one of a velocity and/or acceleration for each of the obtained local traveling directions;

predict a future spatial distribution of ionizing-radiation intensity emitted by the ionizing-radiation source based, at least in part, on at least one of the estimated velocity and/or acceleration of the obtained local traveling directions.

15. The system of claim 14, wherein the system is further configured to:

select, for each antenna pair, an active mode from a group of modes comprising at least a coarse-scan mode and a fine-scan mode;

activate, for at least two antenna pairs of the plurality of antenna pairs comprising at least the detecting antenna pair, the fine-scan mode based on the predicted future spatial distribution of ionizing-radiation intensity emitted by the ionizing-radiation source.

16. The system of claim 11, wherein the sensing units are arranged around a monitored facility according to a placement plan forming a monitored area.

17. A method comprising:

selecting an active mode from a group of modes comprising at least a coarse-scan mode and a fine-scan mode;

rotating, by a rotation drive of a transmitter antenna, at least one radiator about a rotation axis, wherein at least one of the at least one radiator is, at least in part, coated with a radiation-sensitive material;

emitting, by the radio-frequency transmitter antenna, a far-field radiation pattern;

receiving, at a radio-frequency receiver antenna, a received signal indicative of the far-field radiation pattern emitted by the transmitter antenna, wherein exposure of the radiation-sensitive material to ionizing-radiation perturbs the far-field radiation pattern;

generating antenna response data indicative of one or more characteristics of the far-field radiation pattern based on the received signal;

computing at least one of a presence-confidence metric indicative of exposure to ionizing-radiation and/or a traveling direction of an ionizing-radiation source; and responsive to the presence-confidence metric exceeding a threshold in the coarse-scan mode, selecting the fine-scan mode as the active mode.

18. A method for operating a system comprising a plurality of geographically distributed antenna pairs communicatively coupled to a central controller including at least one processor and non-transitory memory storing instructions, each antenna pair including a radio-frequency transmitter antenna and a corresponding radio-frequency receiver antenna, the transmitter antenna having a rotation drive configured to rotate a radiator about a rotation axis and at least a portion of the radiator being coated with a radiation-sensitive material whose exposure to ionizing-radiation perturbs a far-field radiation pattern of the corresponding transmitter antenna, the method comprising:

obtaining, from each receiver antenna, a received signal indicative of the far-field radiation pattern emitted by corresponding transmitter antenna;

generating, for each received signal, antenna response data indicative of one or more characteristics of the far-field radiation pattern;

computing, for each antenna response data associated with respective received signal, at least one of a local presence-confidence metric and/or a local traveling direction of an ionizing-radiation source;

associating at least one of respective local presence-confidence metric and/or respective local traveling direction of an ionizing-radiation source with a geo-spatial location.

* * * * *